United States Patent
Lim et al.

(10) Patent No.: US 9,147,872 B2
(45) Date of Patent: Sep. 29, 2015

(54) OVERCHARGE PREVENTION DEVICE OF BATTERY

(71) Applicants: Hyundai Motor Company, Seoul (KR); Kia Motors Corporation, Seoul (KR)

(72) Inventors: Hae Kyu Lim, Gyeonggi-Do (KR); Jeong Hun Seo, Gyeonggi-Do (KR); Suk Hyung Kim, Gyeonggi-Do (KR); Yoon Cheol Jeon, Gyeonggi-Do (KR); Jun Seok Choi, Gyeonggi-Do (KR); Eun Kyung Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 55 days.

(21) Appl. No.: 14/051,111

(22) Filed: Oct. 10, 2013

(65) Prior Publication Data

US 2015/0000991 A1    Jan. 1, 2015

(30) Foreign Application Priority Data

Jun. 28, 2013  (KR) .......................... 10-2013-0075174

(51) Int. Cl.
*H02H 7/18* (2006.01)
*H01M 2/34* (2006.01)

(52) U.S. Cl.
CPC ............... *H01M 2/345* (2013.01); *H01M 2/34* (2013.01); *H01M 2200/103* (2013.01); *H01M 2200/20* (2013.01); *H01M 2220/20* (2013.01)

(58) Field of Classification Search
CPC ....... B60L 11/1851; B60L 3/04; H01M 2/345
USPC ..................... 180/65.29; 429/7, 61
See application file for complete search history.

(56) References Cited

U.S. PATENT DOCUMENTS

| 5,227,759 | A  | * | 7/1993  | Hatagishi ...................... 337/260 |
| 7,826,189 | B1 | * | 11/2010 | Edwards ........................ 361/86 |
| 8,168,317 | B2 | * | 5/2012  | Yoon et al. .................... 429/99 |
| 8,547,069 | B2 | * | 10/2013 | Jang .............................. 320/154 |
| 8,557,418 | B2 | * | 10/2013 | Byun et al. ..................... 429/61 |
| 8,663,850 | B2 | * | 3/2014  | Inagaki et al. ................ 429/330 |
| 8,717,186 | B2 | * | 5/2014  | Zhou ........................ 340/636.11 |
| 8,852,767 | B2 | * | 10/2014 | Jang et al. ..................... 429/10 |
| 2007/0054157 | A1 | * | 3/2007  | Ryu et al. ........................ 429/7 |
| 2013/0337297 | A1 | * | 12/2013 | Lee et al. ........................ 429/61 |
| 2014/0062418 | A1 | * | 3/2014  | Lim .............................. 320/137 |
| 2014/0127540 | A1 | * | 5/2014  | Min .............................. 429/61 |

FOREIGN PATENT DOCUMENTS

| JP | H05-159762 A | 6/1993 |
| JP | H10-214612 A | 8/1998 |

(Continued)

*Primary Examiner* — John Walters
*Assistant Examiner* — Brian Swenson
(74) *Attorney, Agent, or Firm* — Mintz Levin Cohn Ferris Glovsky and Popeo, P.C.; Peter F. Corless

(57) ABSTRACT

An overcharge prevention device of a battery is provided and includes a safety fuse which is connected to a battery and a safety circuit which is connected in parallel to the battery and the safety fuse and includes a short-circuit switch which is disposed adjacent to a side in which the battery is swelled. The short-circuit switch is opened in a normal state, and short-circuits when the switch is pressurized due to the swelling of the battery to form a closed circuit with the battery and the safety fuse.

4 Claims, 2 Drawing Sheets

(56) References Cited

FOREIGN PATENT DOCUMENTS

| KR | 20-2011-0004897 | | 5/2011 |
| KR | 10-1128423 | B1 | 3/2012 |
| KR | 10-2012-0128552 | A | 11/2012 |
| KR | 10-2013-0066039 | A | 6/2013 |

* cited by examiner

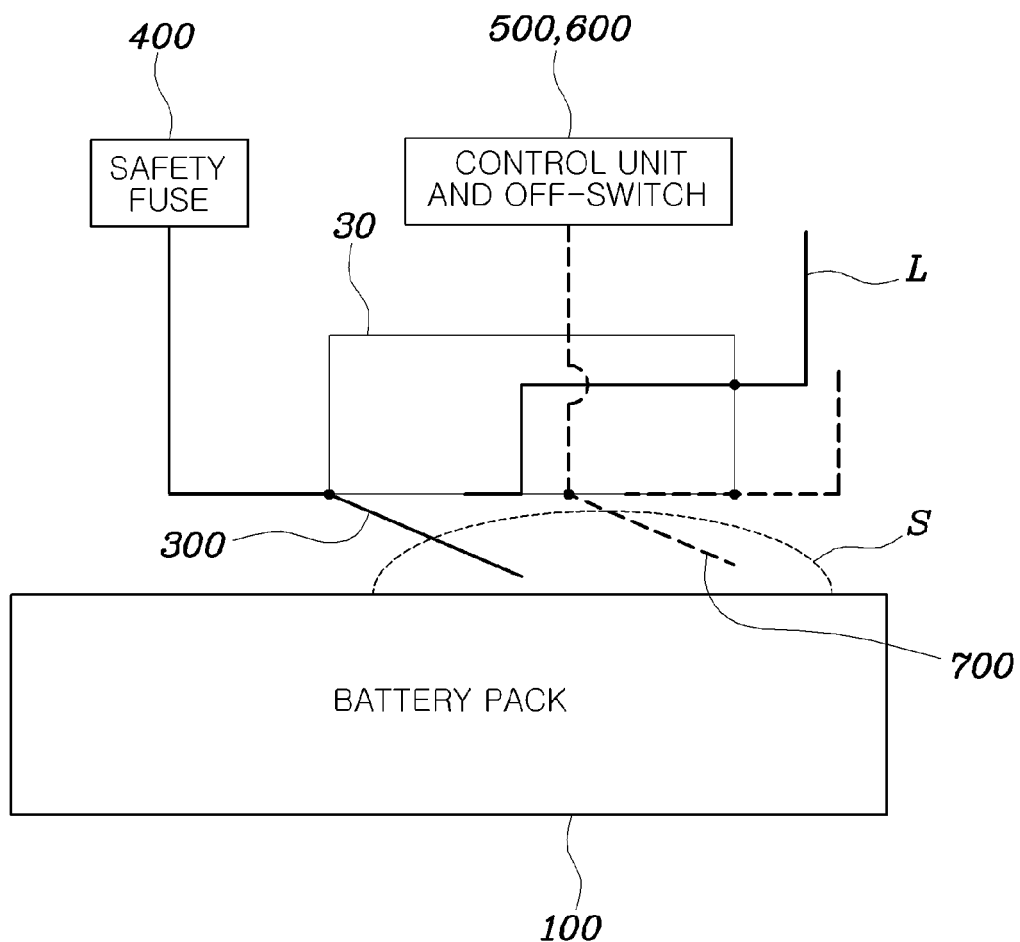

OVERCHARGE PREVENTION DEVICE OF BATTERY

CROSS-REFERENCE TO RELATED APPLICATION

This application claims under 35 U.S.C. §119(a) the benefit of Korean Patent Application No. 10-2013-0075174 filed Jun. 28, 2013 the entire contents of which are incorporated herein by reference.

BACKGROUND (a) Technical Field

The present invention relates to an overcharge prevention device of a battery that cuts off an abnormal operation of a high voltage battery for a motor-driven vehicle or prevents overcharge thereof for a substantial time period.

(b) Background Art

In recent years, in a motor-driven vehicle such as a hybrid vehicle, an electric motor, or a fuel cell vehicle, etc., various technologies with respect to a safety device have been developed. In the safety device, a physical switch is provided to a portion where a high voltage battery is swelled when the battery is overcharged, and the switch prevent further charging of the battery and cuts off connections between the battery and other circuit elements.

However, according to the configuration of the safety devices of the various related arts, since the circuit is disrupted when the battery swells, safety is not secured and malfunction may occur. Moreover, when a separate swelling sensor or a pressure sensor is attached to the safety device costs of sensors increase and stability problems may occur.

The description provided above as a related art of the present invention is merely for helping in understanding the background of the present invention and should not be construed as being included in the related art known by those skilled in the art.

SUMMARY

An object of the present invention is to provide an overcharge prevention device of a battery that cuts off an abnormal operation of a high voltage battery for a motor-driven vehicle or overcharge thereof for a substantial time period.

According to an aspect of the present invention an overcharge prevention device of a battery may include: a safety fuse connected to a battery; and a safety circuit connected in parallel to the battery and the safety fuse and composed of a short-circuit switch disposed adjacent to a side in which the battery is swelled, wherein the short-circuit switch is opened in a normal state (e.g., when the battery does not swell) and short-circuits when the switch is pressurized due to the swelling of the battery to form a closed circuit with the battery and the safety fuse.

In the overcharge prevention device of a battery, the safety fuse may be interposed between battery packs which are connected in series, and the safety circuit may be connected in parallel to both ends of the battery. In addition, in the overcharge prevention device of a battery, an installation space may be formed on the outermost side surface of the battery, and the short-circuit switch may be disposed adjacent to the outermost side surface of the battery in the installation space. Furthermore, in the overcharge prevention device of a battery, a power relay may be connected in parallel to both ends of the battery.

According to another aspect of the present invention, an overcharge prevention device of a battery may include: a safety fuse and a power relay connected to a battery; a safety circuit connected in parallel to the battery and the safety fuse and composed of a short-circuit switch disposed adjacent to the side in which the battery is swelled; a secondary switch disposed closer to the battery than the short-circuit switch; and a control portion configured to detect a short-circuit of the secondary switch and turn off an OFF switch of the power relay.

In the overcharge prevention device of a battery, the secondary switch may be disposed closer to the battery than the short-circuit switch, the secondary switch may be pressurized by the battery when the battery is swelled, to short-circuit firstly, and when the battery is swelled continuously, the short-circuit switch short-circuits.

In the overcharge prevention device of a battery, an OFF-switch of the power relay may be provided on a ground line of the power relay. Further, in the overcharge prevention device of a battery, an installation space may be formed on the outermost side surface of the battery, the secondary switch may be disposed at a center portion of the installation space, the short-circuit switch may be disposed at the side end of the installation space, and the secondary switch may short-circuit before the short-circuit switch when the battery is swelled. Additionally, the safety fuse may be interposed between battery packs connected in series, and the safety circuit may be connected in parallel to both ends of the battery. The power relay may be connected in parallel to both ends of the battery.

BRIEF DESCRIPTION OF THE DRAWINGS

The above and other features of the present invention will now be described in detail with reference to exemplary embodiments thereof illustrated the accompanying drawings which are given herein below by way of illustration only, and thus are not limitative of the present invention, and wherein:

FIG. 2 is an exemplary diagram of an overcharge prevention device of a battery according to another exemplary embodiment of the present invention.

Figure 1:
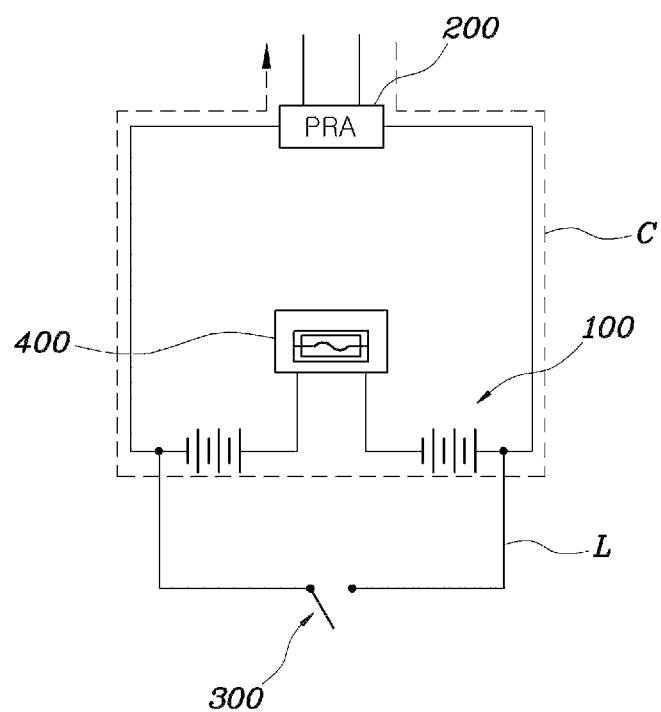
FIG. 1 is an exemplary diagram of an overcharge prevention device of a battery according to an exemplary embodiment of the present invention.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an overcharge prevention device of a battery according to an exemplary embodiment of the present invention will be described with reference to the accompanying drawings.

FIG. 1 is an exemplary diagram of an overcharge prevention device of a battery according to an exemplary embodiment of the present invention. As shown in FIG. 1, the overcharge prevention device for a battery may include: a safety fuse 400 connected to a battery 100; and a safety circuit L connected in parallel to the battery 100 and the safety fuse 400 and composed of a short-circuit switch 300 disposed adjacent to a side in which the battery 100 is swelled. In particular, the short-circuit switch 300 may be opened during a normal state (e.g., the battery is not swelled) and may short-circuit when the switch is pressurized due to the swelling of the battery 100 to form a closed circuit with the battery 100 and the safety fuse 400.

The battery 100 may be connected to a power relay (PRA) 200 for charging, and a separate safety circuit L may be connected in parallel to the battery 100. Moreover, the short-circuit switch 300 may be provided to the safety circuit L, and the short-circuit switch 300 short-circuits when the battery 100 is swelled, to form the closed circuit and cut the safety fuse 400, thereby disconnecting the battery 100 to protect the battery 100 from overcharge.

For this purpose, the safety fuse 400 may be interposed between battery packs connected in series, and the safety circuit L may be connected in parallel to both ends of the battery 100. Moreover, the short-circuit switch 300 may be disposed adjacent to a side in which the battery 100 is swelled, and thus, the short-circuit switch 300 may be connected physically according to the swelling of the battery.

On the other hand, an installation space 30 may be formed on the outermost side surface of the battery 100, and the short-circuit switch 300 may be disposed adjacent to the outermost side surface of the battery 100 within the installation space 30. Therefore, according to the configuration as described above, although capacity of the battery 100 may be increased, the physical swelling may be sensed even in a substantially small space of the one side of the battery.

According to the exemplary embodiment of the present invention, a method of maintaining safety may include forming an aperture that is provided to the portion where the high voltage battery is swelled when the battery is overcharged and a swelling detection switch, that is, a switch capable of sequentially detecting a power relay OFF-switching function and a power source short-circuit (short) switching function may be mounted to the aperture.

As a specific operation mechanism, when the battery is swelled, the power relay OFF-switch may be operated to prevent the overcharge of the battery. However, when an abnormal power relay fusion occurs in a vehicle, the overcharge may cause the battery to continue to swell. The power short-circuit switching may be secondarily operated to cut the S/Plug fuse, to prevent the battery from overcharging. Further, the power relay 200 may be connected in parallel to both ends of the battery 100.

FIG. 2 is an exemplary diagram of an overcharge prevention device of a battery according to another exemplary embodiment of the present invention. The overcharge prevention device of a battery may include: a safety fuse 400 and a power relay 200 connected to the battery 100; a safety circuit L connected in parallel to the battery 100 and the safety fuse 400 and composed of a short-circuit switch 300 disposed adjacent to the side in which the battery 100 is swelled; a secondary switch 700 disposed closer to the battery than the short-circuit switch 300; and a control unit 500 configured to detect a short-circuit of the secondary switch 700 and turn off an OFF-switch of the power relay 200.

In addition, since the secondary switch 700 may be disposed closer to the battery than the short-circuit switch 300, the secondary switch may be pressurized by the battery 100 when the battery is swelled, to short circuit firstly, and when the battery is continuously swelled, the short-circuit switch 300 may short-circuit. On the other hand, an OFF-switch 600 of the power relay 200 may be disposed on a ground line of the power relay 200.

Moreover, an installation space 30 may be formed on the outermost side surface of the battery 100, the secondary switch 700 may be disposed at a substantially center portion of the installation space 30, the short-circuit switch 300 may be disposed at the side end of the installation space 30. Accordingly, the secondary switch 700 may short-circuit before the short-circuit switch 300 when the battery 100 is swelled.

Furthermore, the safety fuse 400 may be interposed between battery packs which are connected in series, and the safety circuit L may be connected in parallel to both ends of the battery 100. Additionally, the power relay 200 may be connected in parallel to both ends of the battery 100. That is, the installation space 30 may be formed on the outermost side surface of the battery 100, the secondary switch 700 may be disposed at the substantially center portion of the installation space 30, and the short-circuit switch 300 may be disposed at the side end of the installation space 30. Accordingly, when the battery 100 is swelled, first, the secondary switch 700 may short-circuit due to a swelled portion S of the battery 100 which enters into the installation space 30, and thereafter, the short-circuit switch 300 may short-circuit according to the increase of the swelling.

Therefore, when the battery is swelled, first, the control unit 500 may receive short-circuit signals based on the short-circuit of the secondary switch 700, and the OFF-switch 600 of the power relay 200 may be opened, and thus, the power relay 200 itself may be turned off. Accordingly, current may be prevented from flowing to prevent the overcharge of the battery 100.

When the battery 100 is continuously overcharged and swelled, according to the dual safety device of the present invention, the short-circuit switch 300 may also short-circuit, and thus, the current of the battery 100 may flow to the closed circuit which is connected via the short-circuit switch 300, not through the power relay 200. Accordingly, the safety fuse 400 may be cut, the safety circuit L which connects the battery 100 may not be opened to charge the battery.

The above-described processes are shown in FIG. 1 in detail. In other words, as shown in FIG. 1, the battery 100 constitutes the safety circuit L which connects the safety fuse 400 and the short-circuit switch 300 when the short-circuit switch 300 short-circuits, and thus, the charge of the battery 100 may no longer be possible when the safety fuse 400 short-circuits.

According to the overcharge prevention device of a battery having the above-described configuration, the swelling detection switching may be mounted on the aperture portion using the swelling of the cell-module, the fuse may be cut through the PRA OFF switching and the power source short-circuit switching sequentially based on the swelling degree, thereby securing safety with respect to the overcharge. An application of an electrode disruption technology may be difficult in the related art due to the design since the capacity of the battery cell increases, however, according to an exemplary embodiment of the present invention safety function may be maintained with a minimum space requirement.

The invention has been described in detail with reference to exemplary embodiments thereof. However, it will be appreciated by those skilled in the art that changes may be made in these exemplary embodiments without departing from the principles and spirit of the invention, the scope of which is defined in the accompanying claims and their equivalents.

What is claimed is:

1. An overcharge prevention device of a battery comprising:
    a safety fuse and a power relay connected to a battery;
    a safety circuit connected in parallel to the battery and the safety fuse and composed of a short-circuit switch disposed adjacent to the side in which the battery is swelled;
    a secondary switch disposed closer to the battery than the short-circuit switch; and
    a control unit configured to detect a short-circuit of the secondary switch and turn off an OFF switch of the power relay, wherein
    when the battery is swelled, the secondary switch is pressurized by the battery, causing the secondary switch to short-circuit,
    when the battery is continuously swelled, the short-circuit switch short-circuits after the secondary switch has short-circuited, and
    an installation space is formed on an outermost side surface of the battery, the secondary switch is disposed at a substantially center portion of the installation space, and the short-circuit switch is disposed at a side end of the installation space.

2. The overcharge prevention device of a battery according to claim 1, wherein an OFF-switch of the power relay is disposed on a ground line of the power relay.

3. The overcharge prevention device of a battery according to claim 1, wherein the safety fuse is interposed between battery packs connected in series, and the safety circuit is connected in parallel to both ends of the battery.

4. The overcharge prevention device of a battery according to claim 3, wherein the power relay is connected in parallel to both ends of the battery.

* * * * *